United States Patent
Jongsma et al.

(10) Patent No.: US 6,493,536 B1
(45) Date of Patent: *Dec. 10, 2002

(54) COMPUTERIZED SYSTEM AND METHOD FOR TEACHING AND ASSESSING THE HOLISTIC SCORING OF OPEN-ENDED QUESTIONS

(75) Inventors: Eugene A. Jongsma, San Antonio, TX (US); David K. Mellott, San Antonio, TX (US)

(73) Assignee: The Psychological Corporation, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/624,444

(22) Filed: Jul. 24, 2000

Related U.S. Application Data (63) Continuation of application No. 08/986,022, filed on Dec. 5, 1997.

(51) Int. Cl.[7] .................................................. G09B 7/00
(52) U.S. Cl. ........................ 434/353; 434/327; 434/323; 434/362; 434/350; 434/118; 706/927
(58) Field of Search ................................. 434/322, 323, 434/353, 327, 362, 350, 118; 706/927

(56) References Cited

U.S. PATENT DOCUMENTS

| | | |
|---|---|---|
| 4,958,284 A | 9/1990 | Bishop et al. |
| 5,035,625 A | 7/1991 | Munson et al. |
| 5,059,127 A | 10/1991 | Lewis et al. |
| 5,259,766 A | 11/1993 | Sack et al. |
| 5,321,611 A | 6/1994 | Clark et al. |
| 5,433,615 A | 7/1995 | Clark |
| 5,437,554 A | 8/1995 | Clark et al. |
| 5,458,493 A | 10/1995 | Clark et al. |
| 5,466,159 A | 11/1995 | Clark et al. |
| 5,558,521 A | 9/1996 | Clark et al. |
| 5,658,161 A | 8/1997 | Roberts et al. |
| 5,672,060 A | 9/1997 | Poor |
| 5,690,497 A * | 11/1997 | Clark et al. ............. 434/322 X |
| RE36,028 E | 1/1999 | Deesen et al. |
| 5,978,648 A * | 11/1999 | George et al. .......... 434/362 X |
| 6,120,299 A * | 9/2000 | Trenholm et al. ....... 434/323 X |
| 6,173,154 B1 * | 1/2001 | Kucinski et al. ........ 434/359 X |
| 6,267,601 B1 * | 7/2001 | Jongsma et al. ........ 434/323 X |

* cited by examiner

*Primary Examiner*—Joe H. Cheng
*Assistant Examiner*—Chanda Harris
(74) *Attorney, Agent, or Firm*—Allen, Dyer, Doppelt, Milbrath & Gilchrist, P.A.

(57) ABSTRACT

A tutorial method for teaching the scoring of open-ended questions holistically includes displaying a student response to a scorer and permitting the scorer to access a rubric containing the rules for scoring that response. The scorer can choose a display form from a handwritten form and a typed text form that retains and originally present errors. Following the scorer's having entered a score, a model score is displayed so that a scoring efficacy may be determined. Annotations prepared by expert scorers may be accessed to enhance the learning process. In addition, a running correlation between the model and entered scores is calculated and displayed for the scorer over a tutorial session that includes attempts at scoring different responses. The system includes a processor, a workstation, and software for performing the above-described method.

15 Claims, 12 Drawing Sheets

Annotation for HIGH Reading Model • Score 6

Judging from the response to Item 1, the story struck an emotional chord in this reader who immediately related the story to a similar personal experience. The student does an excellent job of describing the setting and how it contributes to the mood of the story (see Item 2). The student also seems to capture Ivan's motivation and thinking (see Items 3, 4, and 5). The responses to the poem are thoughtful and reflective. The response to Item 7 represents a plausible connection between the two selections. Overall, this response could be a little stronger, but it is good enough to score a 6.

FIG. 7.

7. Do you think "The Path Through the Cemetery" would have ended differently if the speaker from Angelou's poem had been the one who tried to walk across the cemetery? Justify your answer.

> Probably. It depends if the author of the poem believes in what she's saying. If she believes in what she's saying, then she would have been brave and not imagine things 8. Use these lines to write down any additional thoughts you have about the story and the poem. Tell anything else about your understanding of the selections and what they mean to you.

> Like I said, the story was interesting. I liked the story more than the poem. ~~The~~ Some parts of the poem, I didn't understand, but it was okay.

FIG. 4A.

7. Do you think "The Path Through the Cemetery" would have ended differently if the speaker from Angelou's poem had been the one who tried to walk across the cemetery? Justify your answer.

Yes, because he would not have been able to tell the audience how he died. It would also tell how he felt when he could not move.

8. Use these lines to write down any additional thoughts you have about the story and the poem. Tell anything else about your understanding of the selections and what they mean to you.

I thought that The path through the cemetery was ectseptional.

FIG. 4B.

7. Do you think "The Path Through the Cemetery" would have ended differently if the speaker from Angelou's poem had been the one who tried to walk across the cemetery? Justify your answer.

*yes. because the speaker would add alot on a put more understanding.*

8. Use these lines to write down any additional thoughts you have about the story and the poem. Tell anything else about your understanding of the selections and what they mean to you.

*I had alot understanding about the cemetery because they do have alot of tombs!*

FIG. 4C.

7. Yes. because the speaker would add alot on a put more understanding.

8. I had a lot understanding about the cemetery because they do have alot of tombs!

FIG. 4D.

My grandmother when was a little girl she told me the unique story. I thoughl was true but as I got older I found out it was just a story told by my great great grandfather who is an indian and Irish. I never got to meet him he died many years ago. The closas I have got to him was his gravestone and portraits of him and my grandmother and grandfather I just wish. I now more about him and what he was like to the family. I heard he told so many jokes it was unreal here is one of his jokes "why did the farmer name one pig ink because he kept running out of his pen." I did not think it was very fun but it came from my great great grand father his name was Micheal.

FIG. 5D.

| Assessment 1 • HIGH Writing Model | Rhetorical Effectiveness: Score 5 |
|---|---|
| | Conventions: Score 4 |

Time to Write

Write a speech for a banquet honoring an older person you admire. Your audience will be classmates and adults. Your speech shoould let the audience know what you admire about the person. Tell what this person is like by focusing on an incident or incidents in her or his life. Include dialogue, a physical description of the person, any humorous or interesting habits the person has, and a description of the setting and action of the incident(s). Listening to your speech, your audience should be able to picture the person you are writing about. Sum up by telling what you have gained by knowing this person.

> I'd like to honor Mr. Sampson for what he has taught and showed me so far this year. Other people think he is "wacko" when he does his humorous acts by impersonating a voice other than his own, but I think he just does that to cheer us up because math is really not the most exciting subject there is.
>
> I remember one time when he was teaching and he tried to change his voice into a surfer type guy, but he didn't sound like one but he sure made us laugh. Sometimes he just acts like a little kid, when he runs in class and takes a nap. I know he likes candy, and he just adores chocolates. He might be a grown man but inside he is like his students.
>
> Mr. Sampson has a blonde beard, I think he grew a beard so it would distract a person from looking at his balding head. He stands about 5'10",

*response continues*

FIG. 5A.

| Assessment 1 • MEDIUM Writing Model | Rhetorical Effectiveness: Score 3 |
| --- | --- |
| | Conventions: Score 3 |

Time to Write

Write a speech for a banquet honoring an older person you admire. Your audience will be classmates and adults. Your speech shouold let the audience know what you admire about the person. Tell what this person is like by focusing on an incident or incidents in her or his life. Include dialogue, a physical description of the person, any humorous or interesting habits the person has, and a description of the setting and action of the incident(s). Listening to your speech, your audience should be able to picture the person you are writing about. Sum up by telling what you have gained by knowing this person.

> From the stories I've been told by my grandma — I think that she's been through some tough times. Especially on her journey to America — she told me about all the things she had to go through: the hiding out from people so her parents, grandparents, and herself wouldn't be seen down in the boat they were hiding out in. On their way over here they had to be surrounded by people dieing (could you imagine being around someone who had died on a boat that you were on — the smell and decaying of the bodies?) Throughout their boat ride to America they finally succeeded when they reached New York. The feeling that my grandma said she had when she seen the "Statue of response continues

FIG. 5B.

| Assessment 1 • LOW Writing Model | Rhetorical Effectiveness: Score 1 |
| --- | --- |
| | Conventions: Score 2 |

Time to Write

Write a speech for a banquet honoring an older person you admire. Your audience will be classmates and adults. Your speech shouold let the audience know what you admire about the person. Tell what this person is like by focusing on an incident or incidents in her or his life. Include dialogue, a physical description of the person, any humorous or interesting habits the person has, and a description of the setting and action of the incident(s). Listening to your speech, your audience should be able to picture the person you are writing about. Sum up by telling what you have gained by knowing this person.

> My grandmother when was a little girl she told me the unique story. I thought was true but as I got older I found out it was just a story told by my great great grandfather who is an indian and Irish. I never got to meet him he died many years ago. The closest I have got to him was his gravestone and portraits of him and my grandmother and grandfather I just wish. I now more about him and what he was like to the family, I heard he told so many jokes it was unreal here is one of his jokes "why did the farmer name one pig ink because he kept running out of his pen." I did not think it was very fun but it came from my great great grand father his name was Micheal.

COMPUTERIZED SYSTEM AND METHOD FOR TEACHING AND ASSESSING THE HOLISTIC SCORING OF OPEN-ENDED QUESTIONS

CROSS REFERENCE TO RELATED APPLICATION

This application is a continuation of and incorporates by reference application Ser. No. 08/986,022, filed Dec. 5, 1997, which is commonly owned and assigned with the present invention.

BACKGROUND OF THE INVENTION

1. Field of the Invention

The present invention relates to systems and methods for teaching scoring and for assessing scoring effectiveness and, more particularly, to such systems and methods for teaching and assessing holistic scoring.

2. Description of Related Art

The automation of test scoring is a complex problem that has generated a great deal of interest, owing to a significant economic pressure to optimize efficiency and accuracy and to minimize human involvement. Open-ended or essay-type questions must typically be scored by a human reader, and thus either the physical test form or a visible image thereof must be available for at least the time required for scoring. In addition, scorers (also referred to as readers or resolvers) must be trained in order to become accomplished in analyzing and scoring the answers to open-ended questions effectively, accurately, and quickly.

Computerized systems for scoring open-ended questions are known in the art. In addition, such systems are known that provide feedback to a scorer on validity, reliability, and speed based upon a standard question and model answer. For example, Clark and Clark et al. (U.S. Pat. Nos. 5,321,611; 5,433,615; 5,437,554; 5,458,493; 5,466,159; and 5,558,521) disclose systems and methods for collaborative scoring, wherein scores of two or more resolvers are compared, and a record is kept of each of the resolver's scores. This group of patents also teach the collection of feedback on a resolver, which includes the monitoring of scoring validity, reliability, and speed. One of the criteria is a calculation of a deviation of the resolver's score and a model score by using "quality items." Also discussed is an on line scoring guide for use by the resolver during scoring.

However, there are no systems and methods known in the art that are specifically directed to the teaching of scoring open-ended questions and to providing scoring rules; model answers, scores, and rationales therefor; and feedback to a resolver during the teaching process.

SUMMARY OF THE INVENTION

It is therefore an object of the present invention to provide a system and method for assessing a scorer's grading of an open-ended question.

It is an additional object to provide such a system and method for interactively assisting a scorer in learning a holistic scoring technique.

It is another object to provide such a system and method for tracking a scorer's progress during a practice session.

It is a further object to provide such a system and method for practicing holistic scoring in a variety of content domains such as, but not limited to, reading, writing, science, and mathematics in the same program.

It is yet another object to provide such a system and method for presenting a set of holistic scoring rules, or rubric, to the scorer.

These and other objects are achieved by the system and method of the present invention. One aspect of the method is for teaching a scorer holistically to score an answer to an open-ended question. Holistic scoring is a technique whereby a unitary, typically numerical, score is given for an answer to an open-ended question; for example, in an essay-type response, spelling and grammatical errors and content are all taken into account when granting the score.

The teaching method comprises the step of displaying a student response, which in a particular embodiment may be chosen by the scorer to be presented in handwritten or typed text form, to an open-ended question to a scorer. In a preferred embodiment the scorer is permitted to access for display a scoring rubric for the question, which comprises a set of rules on which the scoring for that question should be based. The scorer then assesses the response and enters a score for the response, which is received by the system. Finally, a model score is presented to the scorer. A comparison of the model score with the scorer's entered score permits him or her to assess his or her scoring efficacy, that is, how close the entered score came to the model score prescribed for the response.

The tutorial software program of the present invention, which may also be referred to simply as a tutorial, in a preferred embodiment comprises a plurality of databases, or. alternatively, a plurality of sectors in a unitary database, containing:

1. A plurality of student responses to an open-ended question. Preferably, each student response is present in an original handwritten image form and in a text form. The text form retains all original errors from the handwritten image.

2. A model score for each student response.

3. A scoring rubric for each question.

4. An analysis of each student response and a rationale for the model score for each student response.

The teaching system of the present invention comprises a computer, or data-processing system, such as, for example, a personal computer or workstation. The computer has resident therein, or has means for communicating with a storage device having resident thereon, a database as described above.

The system also comprises means for displaying a student response to a question to a scorer, means for permitting the scorer to access the scoring rubric for the question, means for receiving a score from the scorer. As described above, these means typically include a personal computer or networked workstation having a keyboard, screen, pointing device, and communication means for accessing a storage device.

Software means are also resident in the computer for presenting on the display means a model score to the scorer to permit the scorer to assess his or her scoring efficacy, that is, how close the assigned score is to the model score. The software means also comprises means for displaying an explanation or annotation of the model score assigned. In addition, means are provided within the processor for tracking the scorer's progress during a practice session with the tutorial. This tracking is preferably accomplished by calculating a running correlation between the model answer and the score entered for each response.

The invention contemplates a system and method for teaching a scorer within a chosen level and discipline. For example, a particular tutorial may comprise a set of questions keyed to a grade level in a particular subject area (e.g., grade 7, history) or in related areas (e.g., grade 8, reading and writing, wherein reading competency is assessed by a student's response to a question on a reading selection, and writing competency is assessed by the student's response to an essay-type question). Alternatively, a set of responses to questions may address the subject matter contained in a professional licensing or qualification examination (e.g., for a laboratory technician).

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered. by the present invention will become more fully apparent as the description that now follows is read in conjunction with the accompanying drawing.

BRIEF DESCRIPTION OF THE DRAWINGS

FIG. 4 illustrates a series of exemplary answers to a question on a reading selection, representing (A) a high reading; (B) medium reading; and (C) low reading models for a Grade 8 student. (D) A typed text version of the low reading model of (C).

FIG. 5 illustrates the first pages of a series of exemplary essays on a prescribed topic, representing (A) a high writing; (B) medium writing; and (C) low writing models for a Grade 8 student. (D) A typed text version of the low writing model of (C).

DETAILED DESCRIPTION OF THE PREFERRED EMBODIMENTS

A description of the preferred embodiments of the present invention will now be presented with reference to FIGS. 1–8.

Figure 1:
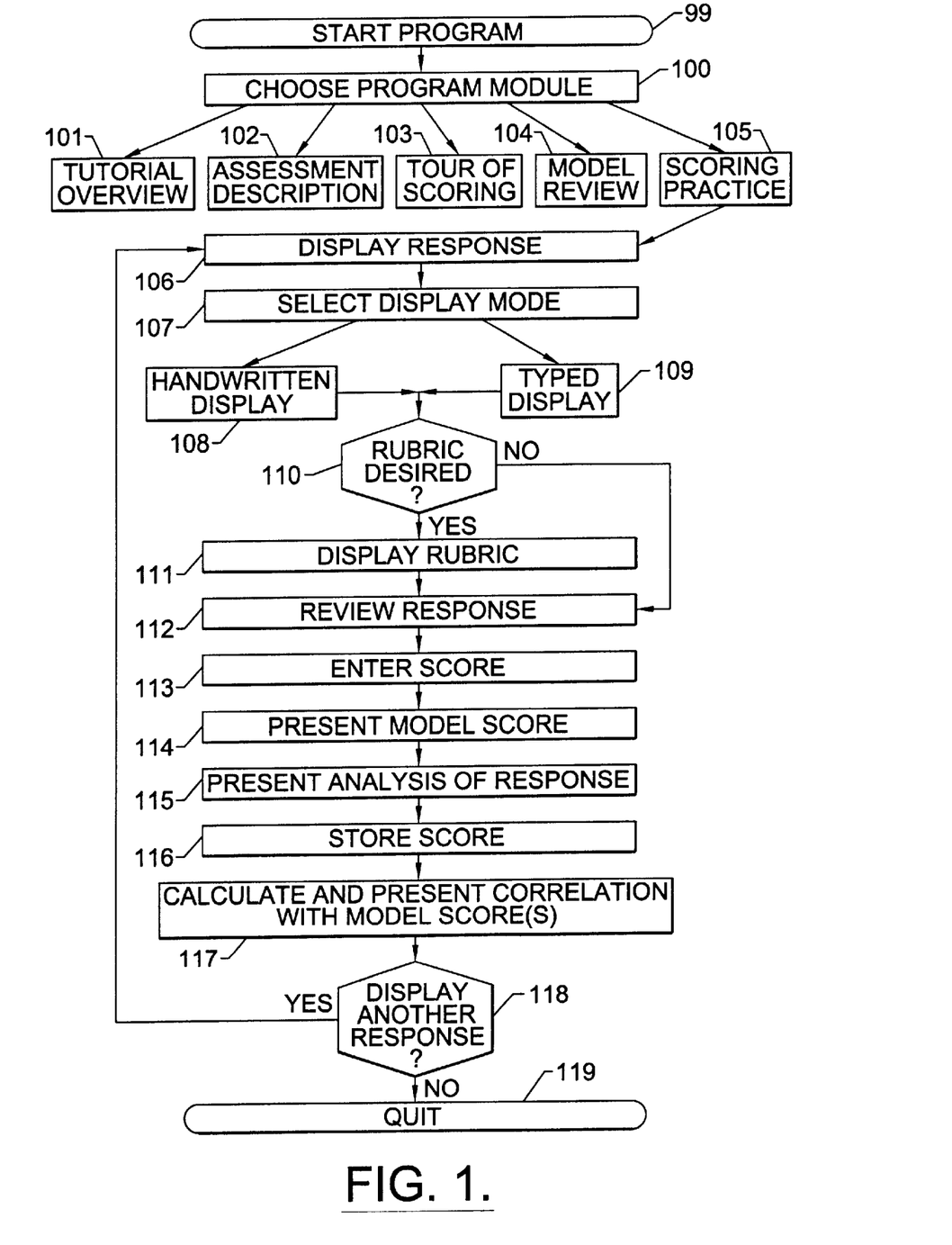
FIG. 1 is a logic flowchart for the method of the present invention for teaching a scorer in a holistic scoring technique.
Figure 2:
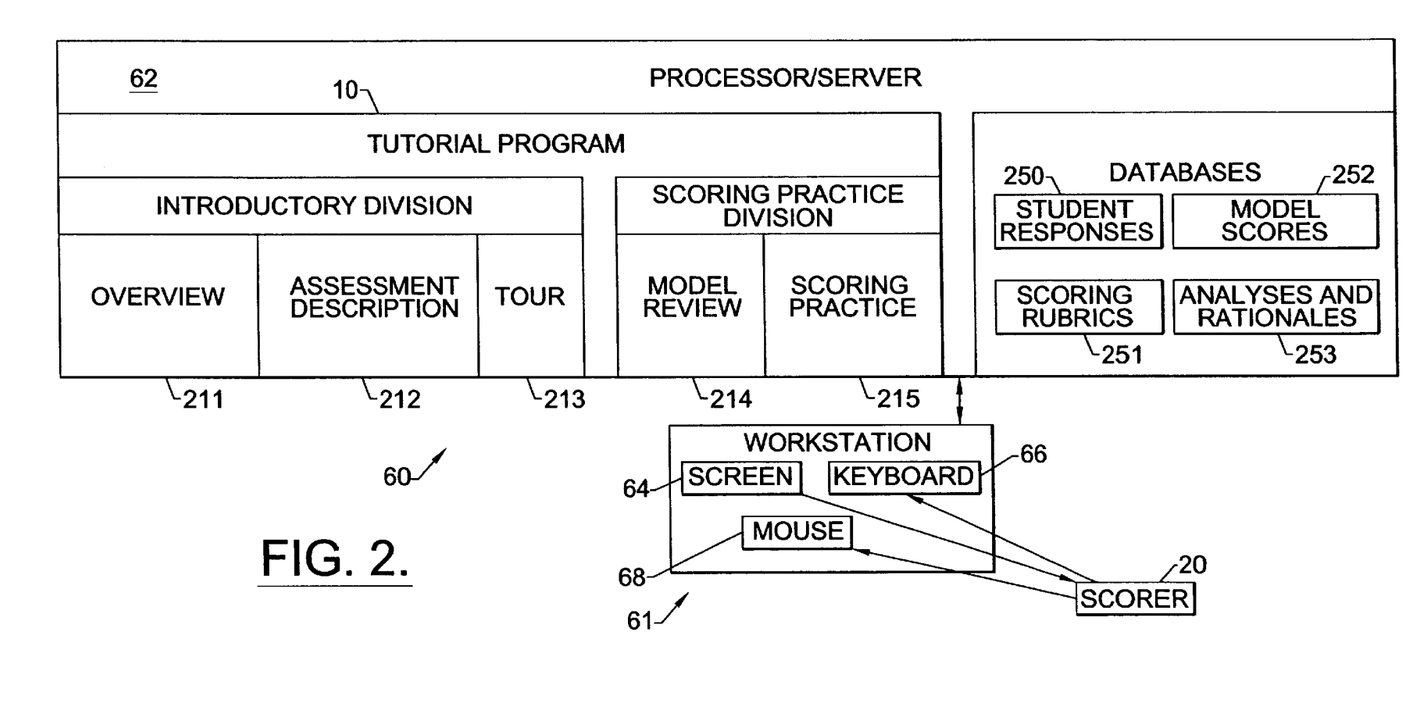
FIG. 2 is a schematic diagram of the system of the present invention.

In a preferred embodiment of the system 60 of the invention, illustrated in FIG. 2, a person 20 desirous of receiving instruction in holistic scoring is provided with access to a processor. The means or access may comprise a personal computer or a workstation 61 or terminal networked to a server computer 62, or an interface to a remote site through telecommunications. internet or other forms of data transmission, although these architectures are not intended to be limiting. The processor 62 has loaded thereon the tutorial software program 10 of the present invention, which will be described in the following. The computer access/interface is preferably provided by means well known in the art, e.g., via a display screen 64, keyboard 66, and pointing device 68 such as a mouse, for use in a Windows® type or Macintosh environment.

A first aspect of the method (FIG. 1) is for teaching a scorer to holistically score an answer or response to an open-ended question (also referred to as an "assessment" or "assessment form" in the art) via a computer-driven tutorial program 10. The method comprises the steps of starting the tutorial program 10 (Step 99) and providing a choice to the scorer 20 of which section or module of the program 10 to enter (Step 100). In a preferred embodiment this choice is presented in the form of a screen-displayed menu (30, FIG. 3) in a Windows®- or Macintosh-type format. This is not intended to be limiting, however, as those skilled in the art will recognize alternate platforms and modes of providing such a selection. In this particular embodiment, two major divisions include introductory (choices 1–3, 211–213) and scoring practice (choices 4 and 5, 214,215) sections.

Figure 3:
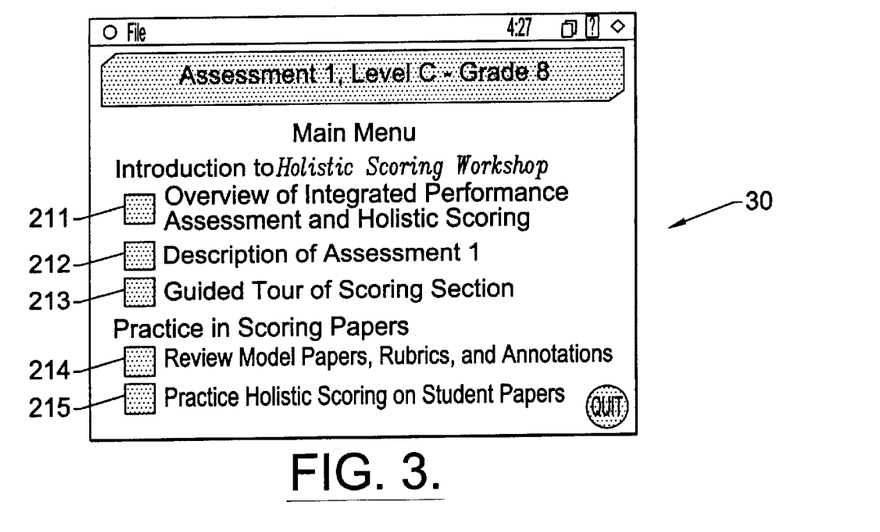
FIG. 3 illustrates an exemplary opening menu for the tutorial program.
Figure 4A:
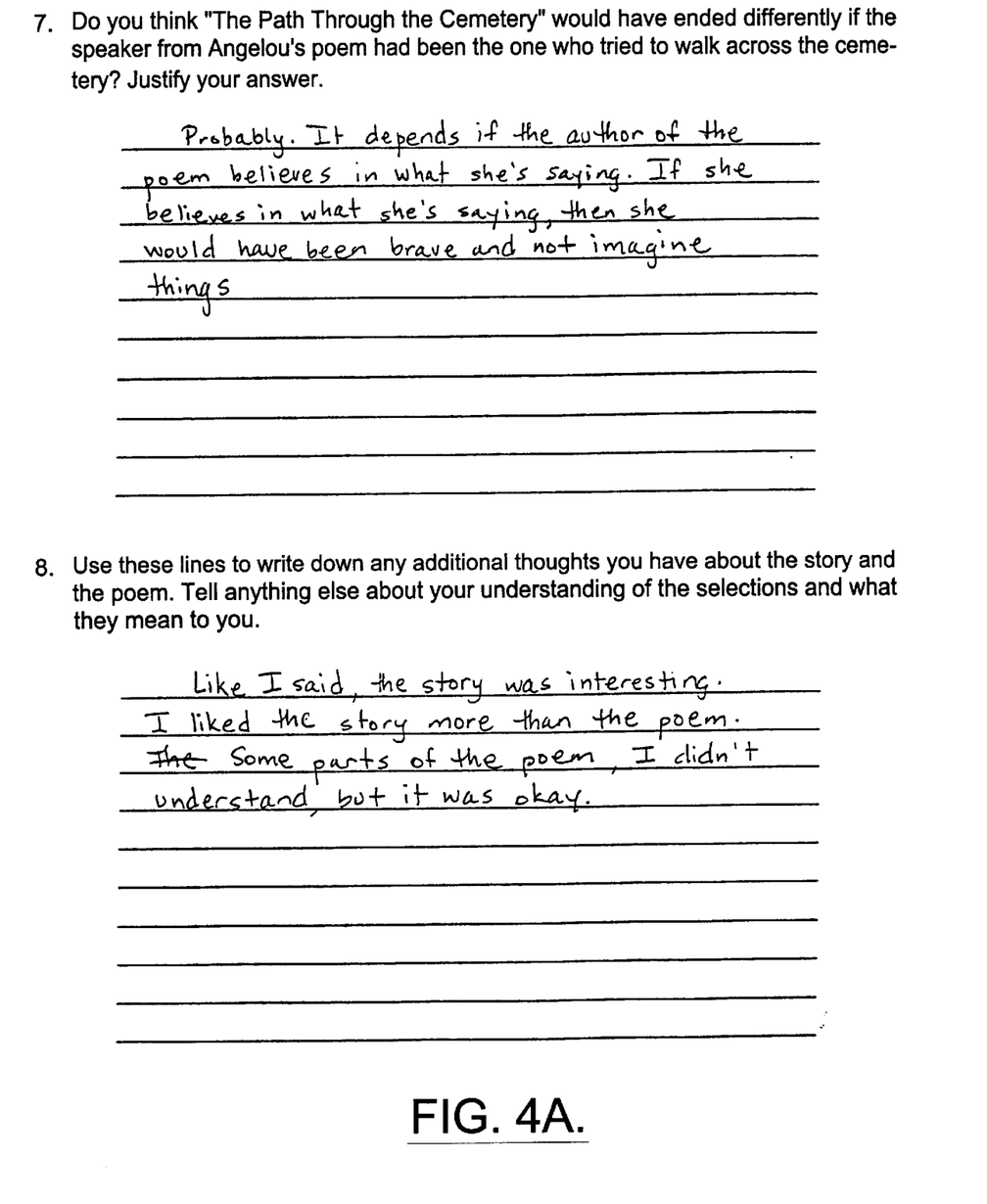
Figure 4B:
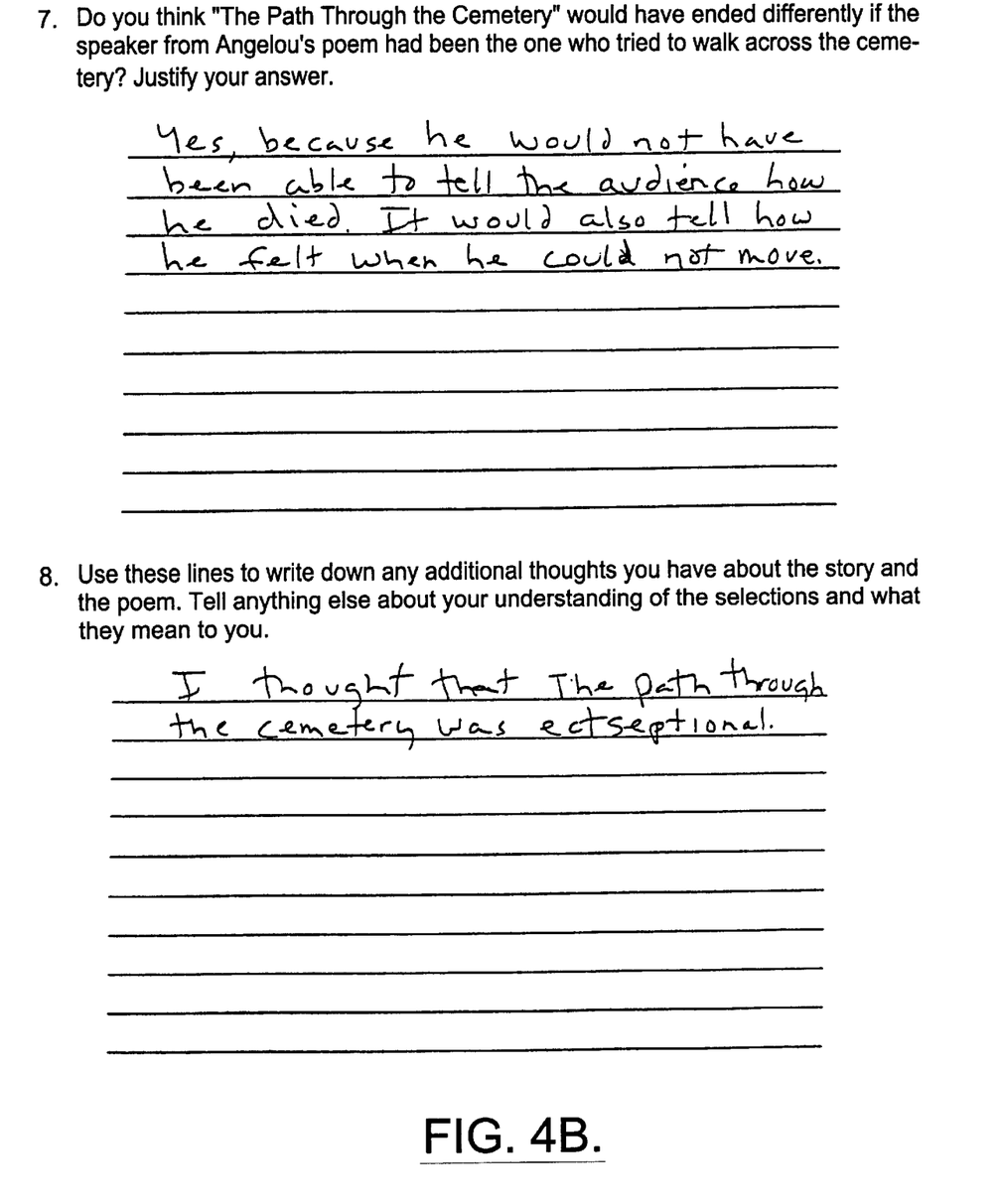
Figure 4C:
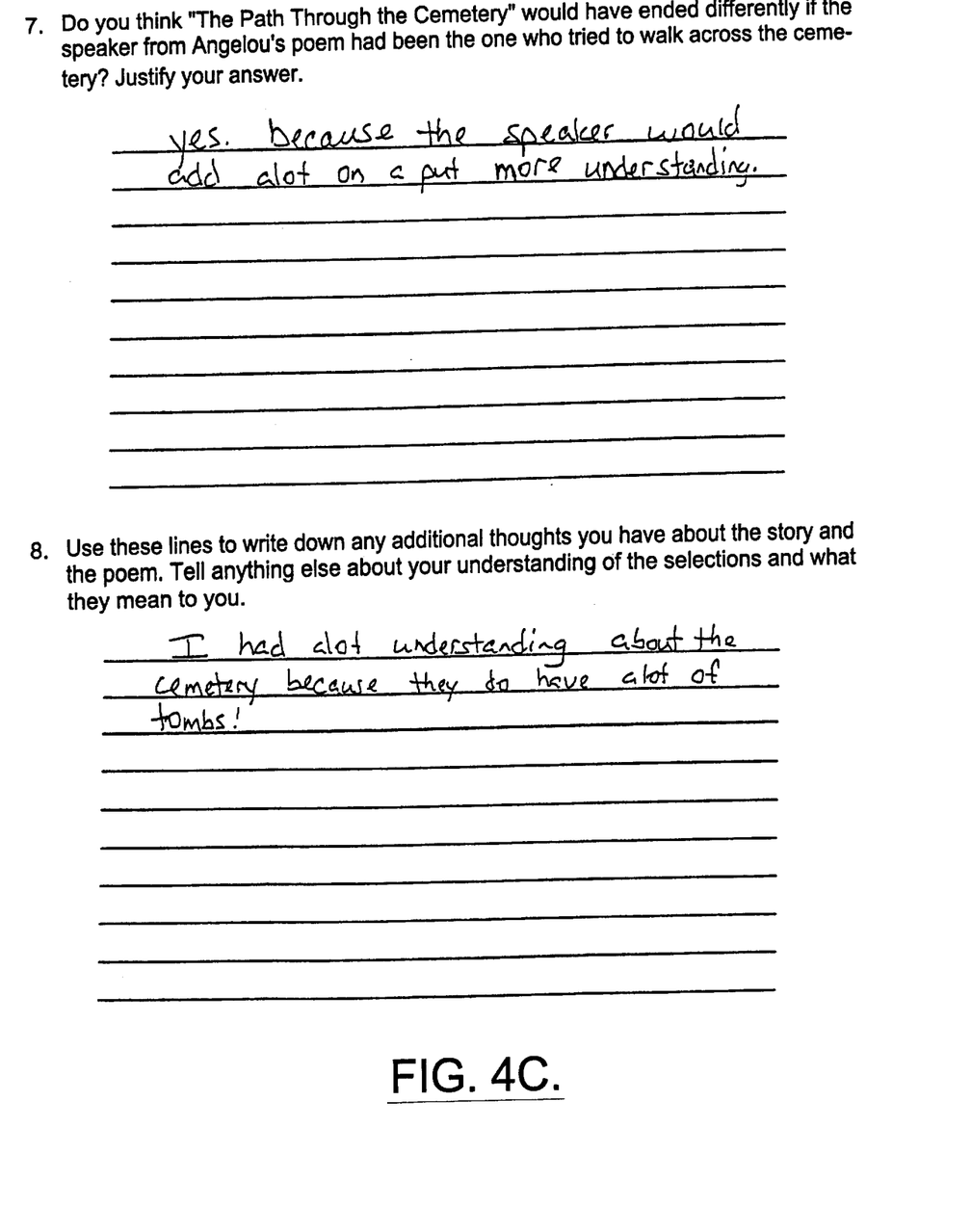
Figure 4D:
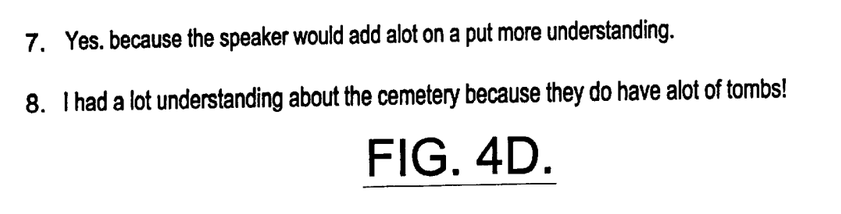

A first choice from the menu 30 comprises an overview (211, Step 101) of the tutorial 10, which introduces the scorer 20 to basic principles of integrated performance assessment and holistic scoring. The rationale underlying the development of this form of assessment and a general introduction to holistic scoring are offered.

A second choice from the menu 30 comprises a description of a particular assessment (212, Step 102), including its content, how to prepare for scoring responses, such as reading and writing responses to that assessment, and how to apply the rubrics.

A third choice from the menu 30 comprises a guided tour of the scoring section (213, Step 103). This section provides an annotated screen-by-screen preview of the scoring training program.

Figure 7:
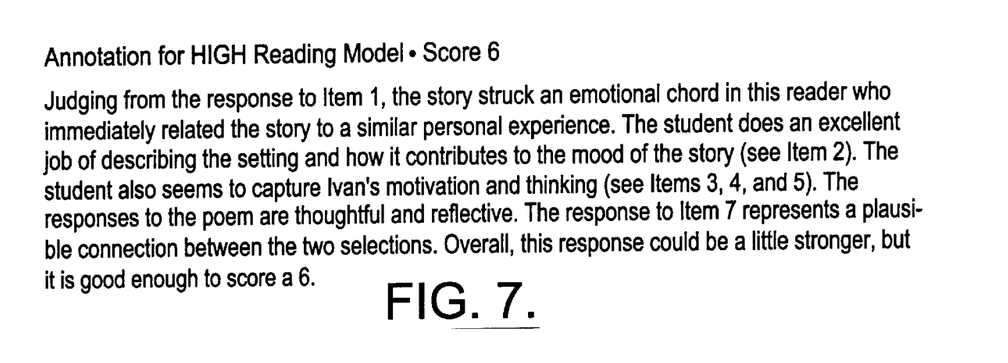
FIG. 7 illustrates a model analysis of a response.

The practice division begins with a fourth choice from the menu 30, a review of model papers, rubrics, and annotations (214, Step 104). This section allows the scorer 20 to try out the training program's features before entering the actual scoring module (215, Step 105). Here the scorer can explore the rubrics for selected parameters such as, but not limited to, reading, rhetorical effectiveness, and conventions. The scorer 20 can view model student answers to illustrate, for example, high, medium, and low levels of performance. Exemplary responses are presented in FIGS. 4A–C, which represent high, medium, and low model written responses, respectively, to two questions on a reading selection, and FIGS. 5A–C, which represent the first pages of high, medium, and low model written essays on a prescribed topic. Note that in the case of FIGS. 5A–C, a dual score is given, one for "rhetorical effectiveness" and one for "conventions." In addition. the scorer 20 can read annotations that analyze the answer and explain the scores assigned (FIG. 7).

The final selection offered on the menu 30 comprises the scoring practice module (215, Step 105), in which the scorer 20 can apply what has been learned in the preceding modules 211–214. A plurality of practice answers are provided for each assessment, preferably representing the gamut of "poor" to "excellent" responses.

In the scoring practice module 215 a first student response to an open-ended question is retrieved from a database 250 of student responses and is displayed to the scorer 20 (Step 106). (Here the word student is not intended to be limiting, but should be taken in the broad context of any person taking a test, which could include, for example, a person taking a licensino examination or professional or technical evaluation test.) This step 106 in a preferred embodiment further comprises providing a means for the scorer 20 to select a display mode (Step 107). The display mode can be one of an original handwritten form (Step 108) or a typed (or "keyboarded") text form (Step 109), wherein the typed text form retains all errors in the original handwritten form, such as spelling, grammatical, syntactical, and punctuation mistakes (see, for example, FIGS. 4C,D and 5C,D, which represent the handwritten and typed text versions of the same responses).

Figure 6:
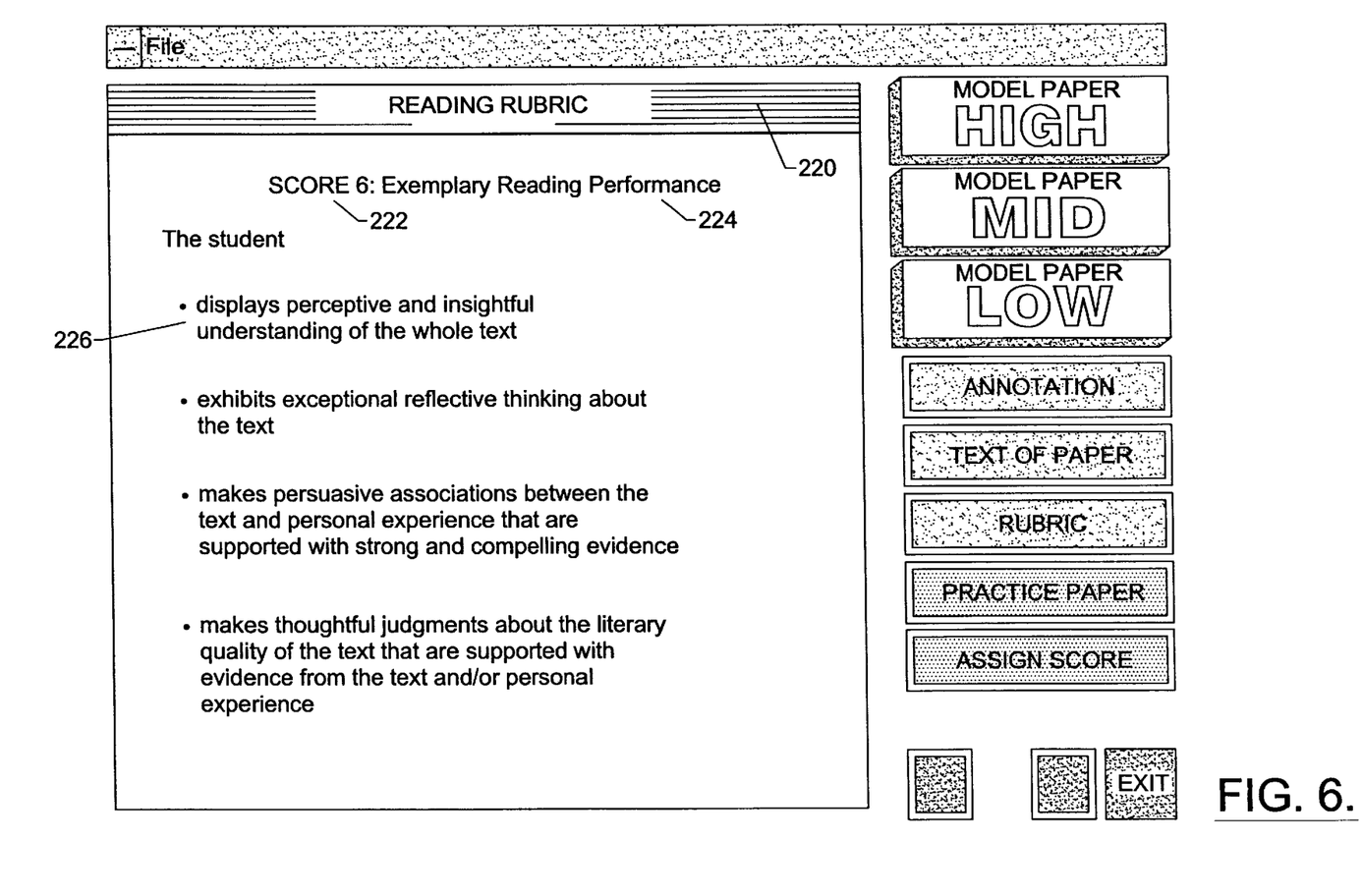
FIG. 6 represents an exemplary screen displaying a scoring rubric for reading.

The scorer 20 is permitted at any time during scoring to access a scoring rubric 220 for the question from a scoring rubric database 251 (FIG. 6, Steps 110,111). Each rubric contains an indication of what a numerical score 222 represents, including both a brief descriptor (e.g., "exemplary reading performance" 224) and an extensive description of each score point 226 (see FIG. 6). This scoring rubric is typically accessed by the scorer 20 via selecting an icon on the screen 64 with the pointing device 68, although this method is not intended to be limiting.

Once the scorer 20 has reviewed the response (Step 112), a score is entered (Step 113), for example, by selecting a number from a button bar 642 on the screen 64 with the pointing device 68. Such methods of selecting from a variety of options is well known in the art, and other, comparable selection methods may also be envisioned, such as entering a number from the keyboard 66.

Figure 8:
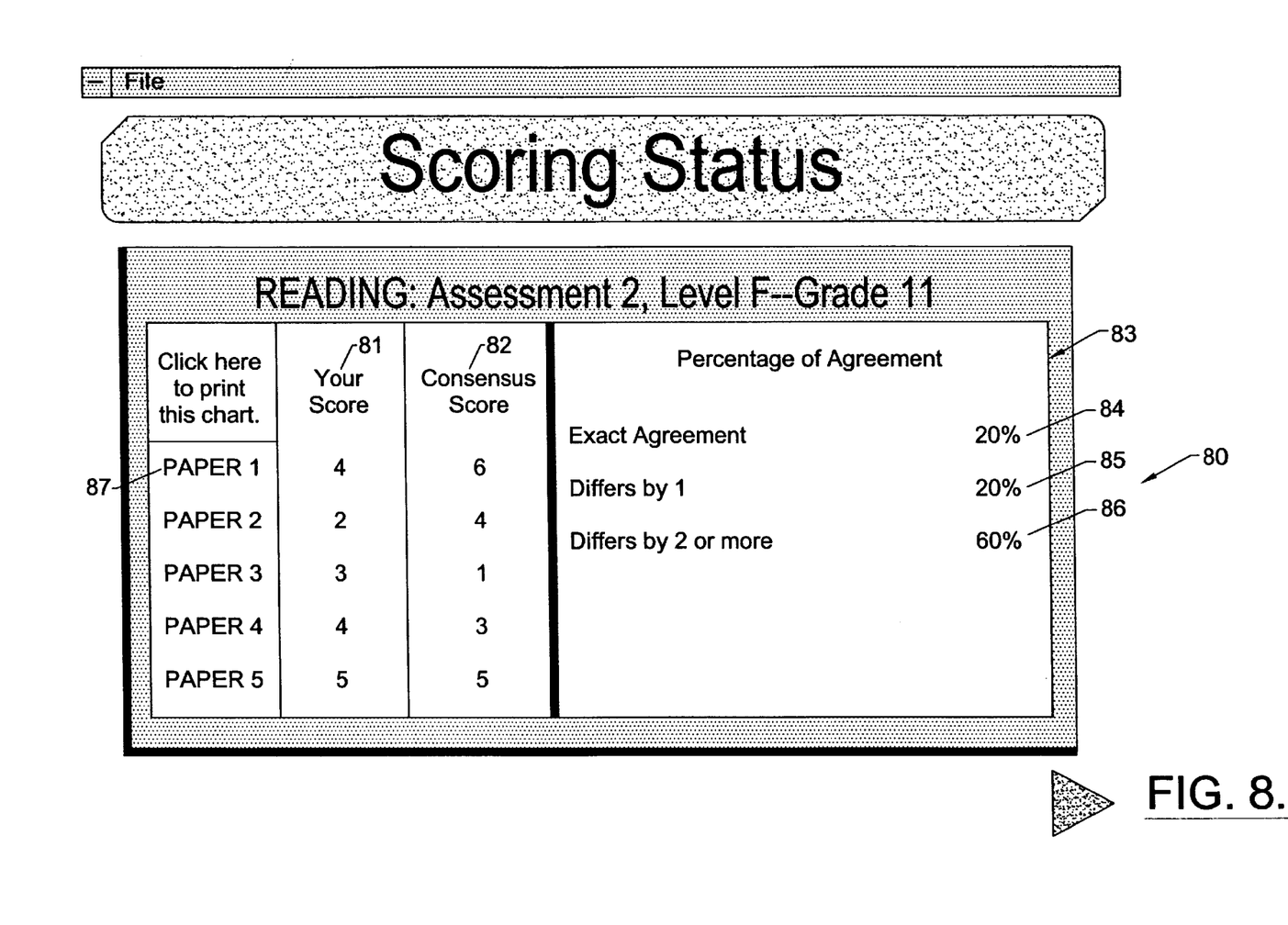
FIG. 8 illustrates a cumulative summary table of a scorer's performance.

When the score has been entered, a model score 228 is retrieved from a database of model scores 252 and is presented to the scorer 20 (Step 114) to permit him or her to assess the scoring efficacy. In addition, an analysis of the answer is retrieved from a database 253 and is presented (Step 115) on the screen 64 to enable the scorer 20 to review his/her score in light of comments of experienced scorers. In the example of FIG. 7, the analysis covers a student's responses to a number of questions on a reading selection, two of which are included in the high reading model of FIG. 4A. The scorer's score is also stored (Step 116), and a correlation is calculated and presented of that score with the model score (FIG. 8 and Step 117).

Figure 5B:
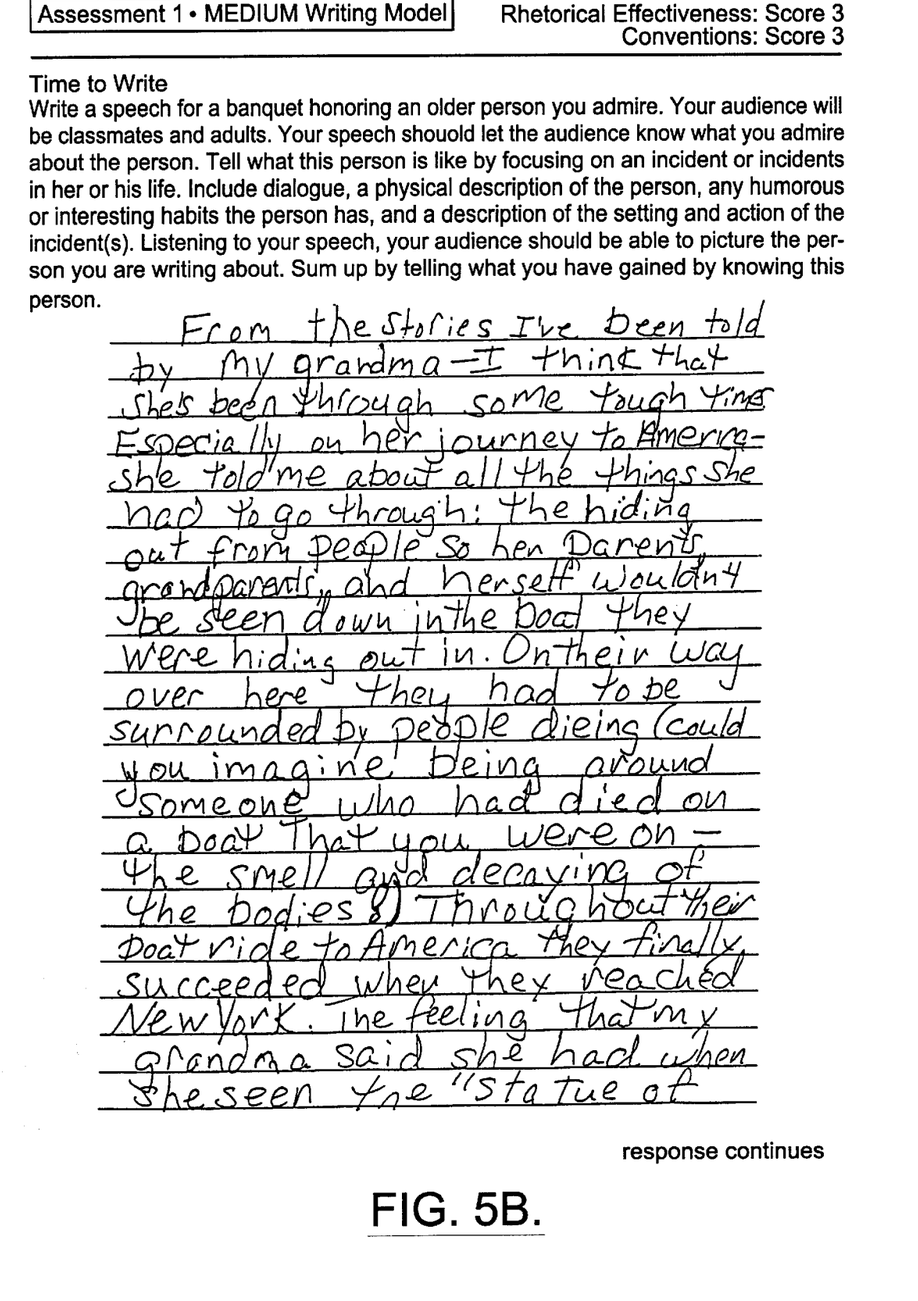
Figure 5C:
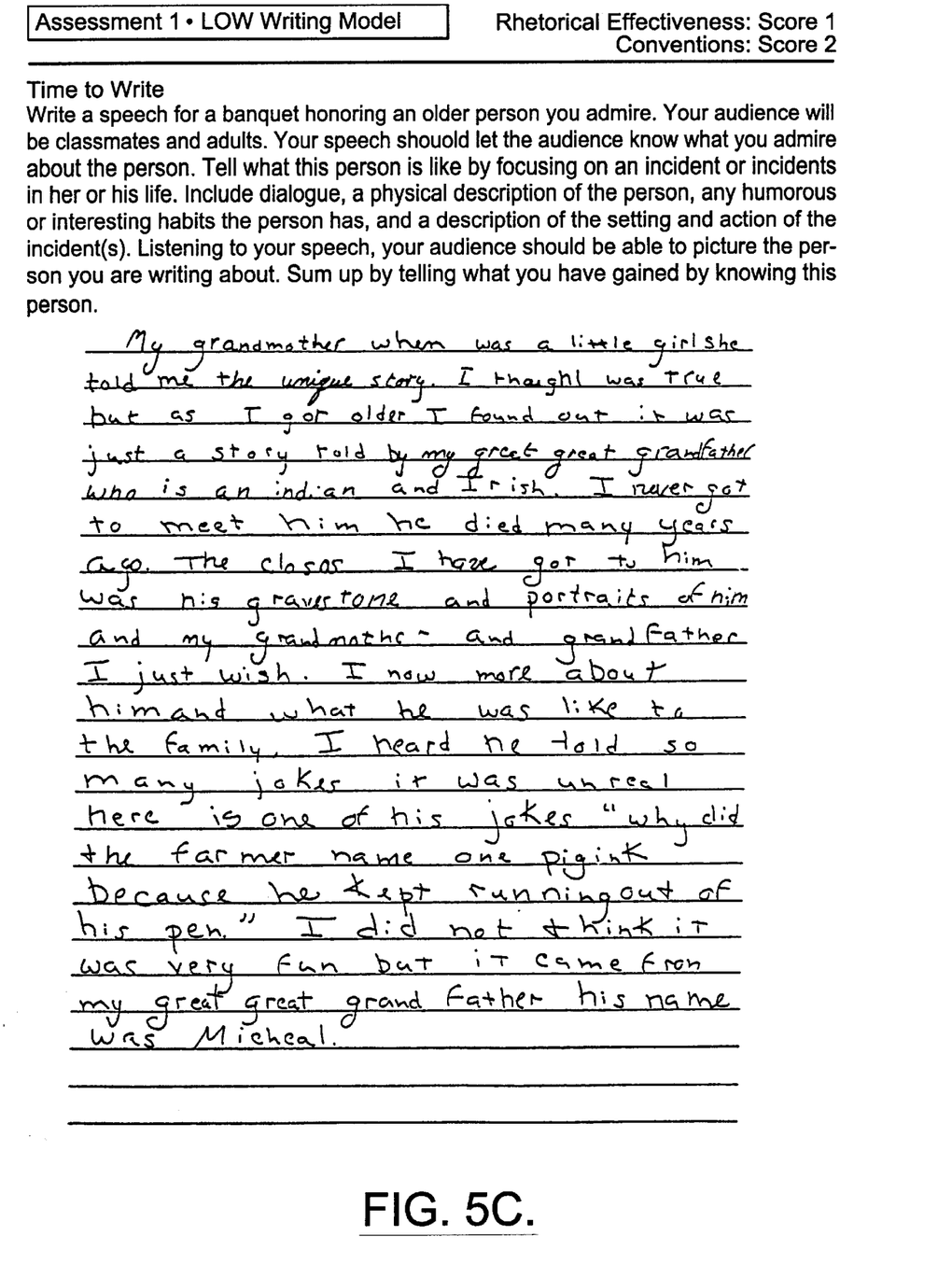
Figure 5D:
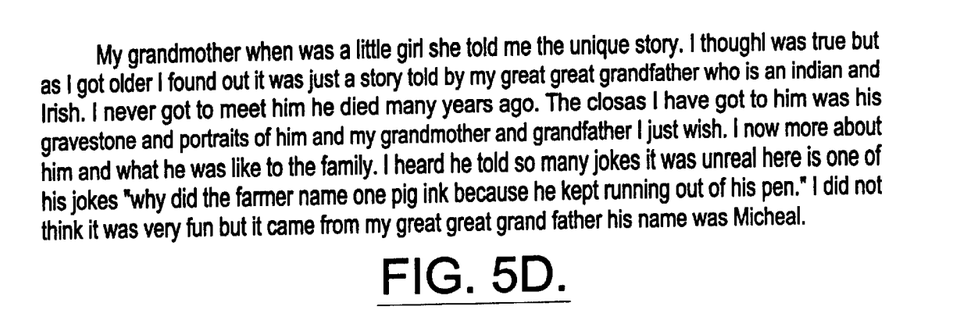

In order to refine the skills learned thus far, the scorer 20 will typically choose to practice on further assessments (Step 118), and thus preferably a plurality of responses are available for scoring. As an example, a range of responses representing "low" to "high" models, such as the A–C parts of FIGS. 4 and 5, are available, as well as answers to several different assessments, such as represented in FIGS. 4 and 5, which are responses to reading and writing assignments, respectively.

After entering each score and displaying the model score therefor, the scorer 20 is presented with a cumulative summary table 80 (FIG. 8 and Step 117), which updates and displays the percentage of agreement between the scorer's evaluation and that of an experienced scorer. For example, the scoring status screen of FIG. 8 tabulates for each paper 87 a column for "your score" 81 and a column for a model, or "consensus score" 82. Also presented is a table of "percentage of agreement" 83, including a percentage of "exact agreement" 84 with the model score, a percentage of scores that "differ by 1" 85, and a percentage of scores that "differ by 2 or more" 86. This particular arrangement is not intended to be limiting, as one of skill in the art could imagine any number of similar correlation calculations and modes or presentation. The concept of a summary table is intended to provide an indicator of progress in learning the holistic scoring technique.

If the scorer 20 wishes to end the tutorial session (Step 118), the "Quit" button 216 on the menu 30 may be selected (Step 119).

It may be appreciated by one skilled in the art that additional embodiments may be contemplated, including similar methods and systems for training personnel in scoring open-ended questions for other fields.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A computerized method for teaching a scorer to holistically score an answer to an open-ended question, the method comprising the steps of:

displaying a description to a scorer of principles of holistic scoring; and displaying to the scorer a training program, comprising the steps of:

displaying a model student response to an open-ended question to the scorer;

permitting the scorer to access a scoring rubric for the question;

receiving a score entered by the scorer; and presenting a model score to the scorer to permit the scorer to assess a scoring efficacy based upon a comparison between the entered score and the model score.

2. The method recited in claim 1, further comprising the step, prior to the training program displaying step, of displaying to the scorer a description of the question.

3. The method recited in claim 2, wherein the description of the question comprises at least one of a question content, a description of preparation for scoring responses, and a description of how to apply the scoring rubric.

4. The method recited in claim 1, further comprising the step, prior to the training program displaying step, of displaying to the scorer a preview of the training program.

5. The method recited in claim 4, wherein the preview displaying step comprises the step of displaying to the scorer a view of each of the steps of the training program on a screen.

6. The method recited in claim 1, wherein the model student response displaying step comprises displaying the response in an original handwritten form.

7. The method recited in claim 1, wherein the model student response displaying step comprises displaying the response in typed text form, wherein the typed text form represents an original handwritten form and retains all original errors.

8. The method recited in claim 1, wherein the model student response displaying step comprises providing a means for the scorer to select a display mode, the display mode one of an original handwritten form or a typed text form.

9. The method recited in claim 1, further comprising the steps of, preceding the student response displaying step, of displaying a series of images to the user comprising a series of model student answers, corresponding analytical annotations for each answer, and an explanation of a score assigned to each answer, for preparing the user to score a student response.

10. A method for teaching a scorer to holistically score an answer to an open-ended question, the method comprising the steps of:

displaying to a scorer an overview of a holistic scoring process;

permitting the scorer to choose a display form from between an original handwritten form and a typed text form, wherein the typed text form represents an original handwritten form and retains all original errors;

displaying a student response to an open-ended question to a scorer in the chosen display form;

receiving a score entered by the scorer; and presenting a model score to the scorer to permit the scorer to assess a scoring efficacy based upon a comparison between the entered score and the model score.

11. The method recited in claim 10, further comprising the steps of:

permitting the scorer to access a model response to the open-ended question for comparison with the student response.

12. The method recited in claim 10, wherein the model response comprises a plurality of model responses, one at each level of a predetermined succession of performance levels.

13. The method recited in claim 12, wherein the predetermined succession of performance levels comprises a set of "high," "medium," and "low" levels.

14. A system for teaching a scorer to holistically score an answer to an open-ended question, the system comprising:

a computer having resident therein:

a database of student responses to a plurality of open-ended questions, each student response present in an original handwritten image form and in a text form, the text form retaining all original errors from the handwritten image, the database further containing a scoring rubric for each question; and an introductory division comprising principles of holistic scoring, a description of the open-ended questions, and a preview of the teaching system;

means for displaying a student response to a question to a scorer;

means for permitting the scorer to access the scoring rubric for the question;

means for receiving a score for the student response from the scorer; and means for presenting on the display means a model score to the scorer to permit the scorer to assess a scoring efficacy based upon a comparison of the model score with the received score.

15. The system recited in claim 14, wherein the display means and the access permitting means comprise a workstation having a screen and a keyboard, the workstation in electronic communication with the computer.

* * * * *